US012317381B1

(12) United States Patent
Zhuo

(10) Patent No.: US 12,317,381 B1
(45) Date of Patent: May 27, 2025

(54) CENTRALIZED CONTROL POWER SUPPLY AND SYSTEM

(71) Applicant: Dafeng Zhuo, Guangdong (CN)

(72) Inventor: Dafeng Zhuo, Guangdong (CN)

( * ) Notice: Subject to any disclaimer, the term of this patent is extended or adjusted under 35 U.S.C. 154(b) by 0 days.

(21) Appl. No.: 18/826,440

(22) Filed: Sep. 6, 2024

(51) Int. Cl.

| | |
|---|---|
| ***H05B 45/10*** | (2020.01) |
| ***H05B 45/34*** | (2020.01) |
| ***H05B 45/355*** | (2020.01) |
| ***H05B 47/19*** | (2020.01) |

(52) U.S. Cl.
CPC ............. *H05B 45/10* (2020.01); *H05B 45/34* (2020.01); *H05B 45/355* (2020.01); *H05B 47/19* (2020.01)

(58) Field of Classification Search
CPC ........ H05B 45/10; H05B 45/34; H05B 47/19; H05B 45/355; H05B 45/30; F21Y 2115/10
See application file for complete search history.

(56) References Cited

U.S. PATENT DOCUMENTS

| | | | | |
|---|---|---|---|---|
| 2012/0169240 | A1* | 7/2012 | Macfarlane | H05B 45/38 323/210 |
| 2013/0093357 | A1* | 4/2013 | Lee | H05B 45/14 315/297 |
| 2018/0112837 | A1* | 4/2018 | Sadwick | H05B 45/3725 |
| 2023/0189409 | A1* | 6/2023 | Xiong | H05B 45/31 315/294 |
| 2023/0273661 | A1* | 8/2023 | Kolovos | H02M 1/325 |

* cited by examiner

*Primary Examiner* — Monica C King

(57) ABSTRACT

A centralized control power supply includes a control circuit board, and a signal connecting terminal, a power input terminal and a first output terminal which are electrically connected with the control circuit board, wherein the numbers of the signal connecting terminals and the first output terminals are at least one. The first output terminal is used for connecting a lamp, the power input terminal is used for connecting a power supply, the signal connecting terminal is used for externally connecting a controller, and the signal connecting terminal is used for transmitting a control signal output by the controller to the control circuit board; and the control circuit board controls one of the on, off and brightness adjustment of the lamp through the first output terminal according to the control signal.

19 Claims, 9 Drawing Sheets

CENTRALIZED CONTROL POWER SUPPLY AND SYSTEM

TECHNICAL FIELD

The present disclosure relates to the technical field of lamps, in particular to a centralized control power supply and a centralized control power supply system.

BACKGROUND

Generally, the LED (Light Emitting Diode) driver includes an input port, a circuit board and an output port, wherein the input port is used for connecting electric supply, the output port is used for connecting an LED lamp, and the circuit board is used for converting the electric supply into a voltage suitable for the LED lamp and then outputting the voltage from the output port to drive the LED lamp to work. However, at present, the existing LED driver cannot directly output a control signal for controlling the on, off or brightness adjustment of the LED lamp to the LED lamp. It is necessary to configure a control switch between the LED driver and the lamp through wiring to control the on, off or brightness adjustment of the LED lamp. This method is cumbersome and inconvenient for users to use. And the existing LED driver does not have a prompting function when the power of the connected LED lamp is exceeded, so that when the LED driver is connected to the LED lamp with overloaded power, the LED driver is easily damaged and the service life of the LED driver is reduced.

SUMMARY

The present disclosure aims to provide a centralized control power supply and a centralized control power supply system to solve the problem that the existing LED driver does not have the output control signal for controlling the on, off or brightness adjustment of the LED lamp to the LED lamp.

In order to solve the technical problem, the technical scheme provided by the present disclosure is as follows.

A centralized control power supply, includes a control circuit board, and a signal connecting terminal, a power input terminal and a first output terminal which are electrically connected with the control circuit board, wherein the numbers of the signal connecting terminals and the first output terminals are at least one;

the first output terminal is used for connecting a lamp, the power input terminal is used for connecting a power supply, the signal connecting terminal is used for externally connecting a controller, and the signal connecting terminal is used for transmitting a control signal output by the controller to the control circuit board; and the control circuit board controls one of the on, off and brightness adjustment of the lamp through the first output terminal according to the control signal.

Further, the centralized control power supply also includes a second output terminal, the second output terminal is electrically connected with the control circuit board, and the second output terminal is used for connecting external equipment; and the control circuit board is used for processing first alternating current input by the power input terminal to form preset direct current and outputting the preset direct current through the second output terminal.

Further, the number of the signal connecting terminals is two, the two signal connecting terminals are connected in parallel, and the signal connecting terminals also can be used for connecting a signal connecting terminal on another centralized control power supply.

Further, the centralized control power supply also includes an overload prompting unit, and the overload prompting unit is electrically connected with the control circuit board; and the control circuit board drives the overload prompting unit to work when the rated power of the lamp connected to the first output terminal and/or the second output terminal is detected to be exceeded.

Further, the power of the first output terminal is smaller than power output by the second output terminal.

Further, the second output terminal is a stud wiring terminal, and the first output terminal is a plugging wiring terminal.

Further, the number of the first output terminals is six.

Further, the centralized control power supply includes an outer shell and a bottom shell connected with the outer shell to form a mounting cavity, the control circuit board is arranged inside the mounting cavity, and the signal connecting terminal, the power input terminal, the first output terminal, the second output terminal and the overload prompting unit are all arranged on the control circuit board;

the outer shell or the bottom shell is detachably provided with a first cover plate at the position corresponding to the second output terminal, and a first wire outlet hole is formed in one of the first cover plate, the outer shell and the bottom shell;

the outer shell or the bottom shell is detachably provided with a second cover plate at the position corresponding to the power input terminal, a second wire outlet hole is formed in one of the second cover plate, the outer shell and the bottom shell, and avoidance ports are formed in the outer shell at the positions corresponding to the signal connecting terminal and the first output terminal.

Further, the power input terminal and the second output terminal are respectively arranged at both ends of the control circuit board, and the first output terminal is located at the position, close to the second output terminal, of the control circuit board.

Further, the signal connecting terminal is located at the position, close to the second output terminal, of the control circuit board.

Further, the control circuit board is integrated with a voltage stabilizing filter module, a PFC (Power Factor Correction) module, a transformer and a driver module, the voltage stabilizing filter module is respectively electrically connected with the power input terminal and the PFC module, the transformer is respectively electrically connected with the first output terminal, the PFC module and the driver module, and the driver module is respectively electrically connected with the first output terminal and the signal connecting terminal;

the voltage stabilizing filter module is used for carrying out voltage stabilizing and filtering processing on first alternating current input by the power input terminal to form second alternating current and transmitting the second alternating current to the PFC module; the PFC module is used for adjusting current waveforms in the second alternating current to be the same as voltage waveforms in the second alternating current to form third alternating current and transmitting the third alternating current to the transformer; the transformer is used for converting the third alternating current into first direct current and then transmitting the first direct current to the first output terminal and the driver module; and the driver module is used for controlling one of the on, off and brightness adjustment of the lamp through the first output terminal according to the control signal input by the signal connecting terminal.

Further, the centralized control power supply also includes a second output terminal, the second output terminal is electrically connected with an output end of the transformer.

Further, the number of the signal connecting terminals is two, one pin of each signal connecting terminal is electrically connected with the output end of the transformer, one pin of the signal connecting terminal is grounded, and one pin of the signal connecting terminal is used for transmitting the control signal.

Further, the control circuit board is integrated with a synchronous rectification module, an input end of the synchronous rectification module is connected with the transformer, and an output end of the synchronous rectification module is respectively electrically connected with the first output terminal, the second output terminal and a signal output terminal.

Further, the driver module includes a first triode and a first switch tube, a base electrode of the first triode is electrically connected with the signal connecting terminal, an emitting electrode of the first triode is grounded, a collector electrode of the first triode is electrically connected with a control end of the first switch tube through a first resistor, and the collector electrode of the first triode is also electrically connected with the output end of the synchronous rectification module through a second resistor; and a drain electrode of the first switch tube is electrically connected with the first output terminal, and a source electrode of the first switch tube is grounded.

Further, the control circuit board is also integrated with a current detection module, the centralized control power supply also includes an overload prompting unit, and the current detection module is respectively electrically connected with the overload prompting unit, the synchronous rectification module and the source electrode of the first switch tube; and the current detection module is used for detecting current output by the source electrode of the first switch tube and driving the overload prompting unit to work when the current is larger than preset current.

Further, the overload prompting unit is a bi-color light, a common pin of the bi-color light is electrically connected with the output end of the synchronous rectification module, a negative electrode of a red diode in the bi-color light is electrically connected with the current detection module, and a negative electrode of a green diode in the bi-color light is electrically connected with the source electrode of the first switch tube.

Further, the current detection module includes an operational amplifier and a current detection resistor, one end of the current detection resistor is grounded, and the other end of the current detection resistor is connected to a source electrode of the first switch tube;

the output end of the synchronous rectification module is electrically connected with the operational amplifier for supplying power for the operational amplifier, a negative electrode of the green diode of the bi-color light is electrically connected to the source electrode of the first switch tube through a third resistor and a fourth resistor in sequence, a noninverting input end of the operational amplifier is grounded through a capacitor, one end, away from the ground, of the capacitor is electrically connected with an output end of the third resistor, a reverse input end of the operational amplifier is grounded through a fifth resistor, the reverse input end of the operational amplifier is also electrically connected with the output end of the synchronous rectification module through a sixth resistor and a seventh resistor, and an output end of the operational amplifier is connected to the negative electrode of the red diode in the bi-color light.

The present disclosure further provides a centralized control power supply system, includes a signal connecting wire, at least one controller and a plurality of centralized control power supplys described above, wherein a signal connecting terminal on at least one centralized control power supply is connected to one controller, both ends of the signal connecting wire are respectively connected to signal connecting terminals on two centralized control power supplys, the controller is used for outputting the control signal to the control circuit board in the centralized control power supply, and the control signal is transmitted to the other centralized control power supply through the signal connecting terminal of the centralized control power supply when one centralized control power supply receives the control signal.

Further, the controller is a wireless receiver, and the wireless receiver is used for receiving a wireless signal transmitted by external equipment; and electricity is obtained from the control circuit board through the signal connecting terminal when the controller is electrically connected with the signal connecting terminal.

Beneficial effects: compared with the prior art, the signal connecting terminal for connecting the controller is directly arranged on the control circuit board, so that the controller can be switched on through a connecting wire directly by a user conveniently. The on, off and brightness adjustment of the lamp can be controlled directly through the control circuit board, so that the operation of complex wiring when the lamp is arranged by the user is saved, the lamp is convenient to use, and the user experience is improved.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
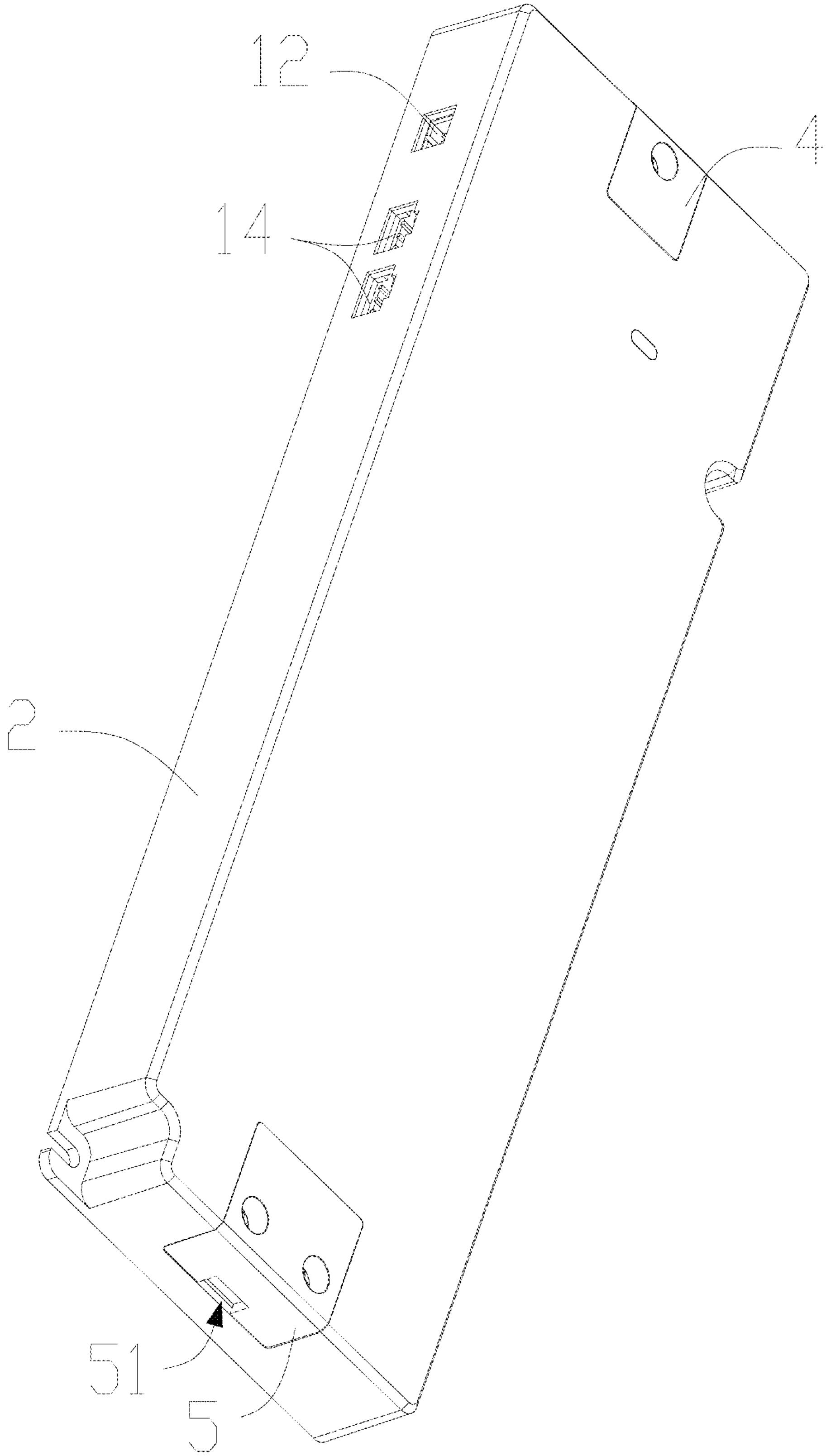
FIG. 1 is a space diagram of a centralized control power supply in the present disclosure.
Figure 2:
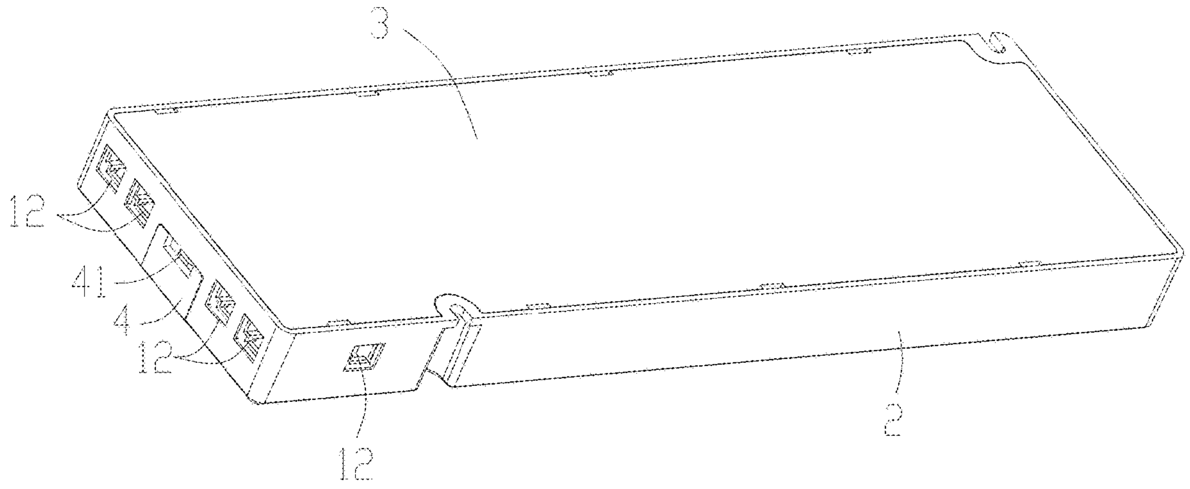
FIG. 2 is a space diagram of a centralized control power supply at another visual angle in the present disclosure.
Figure 3:
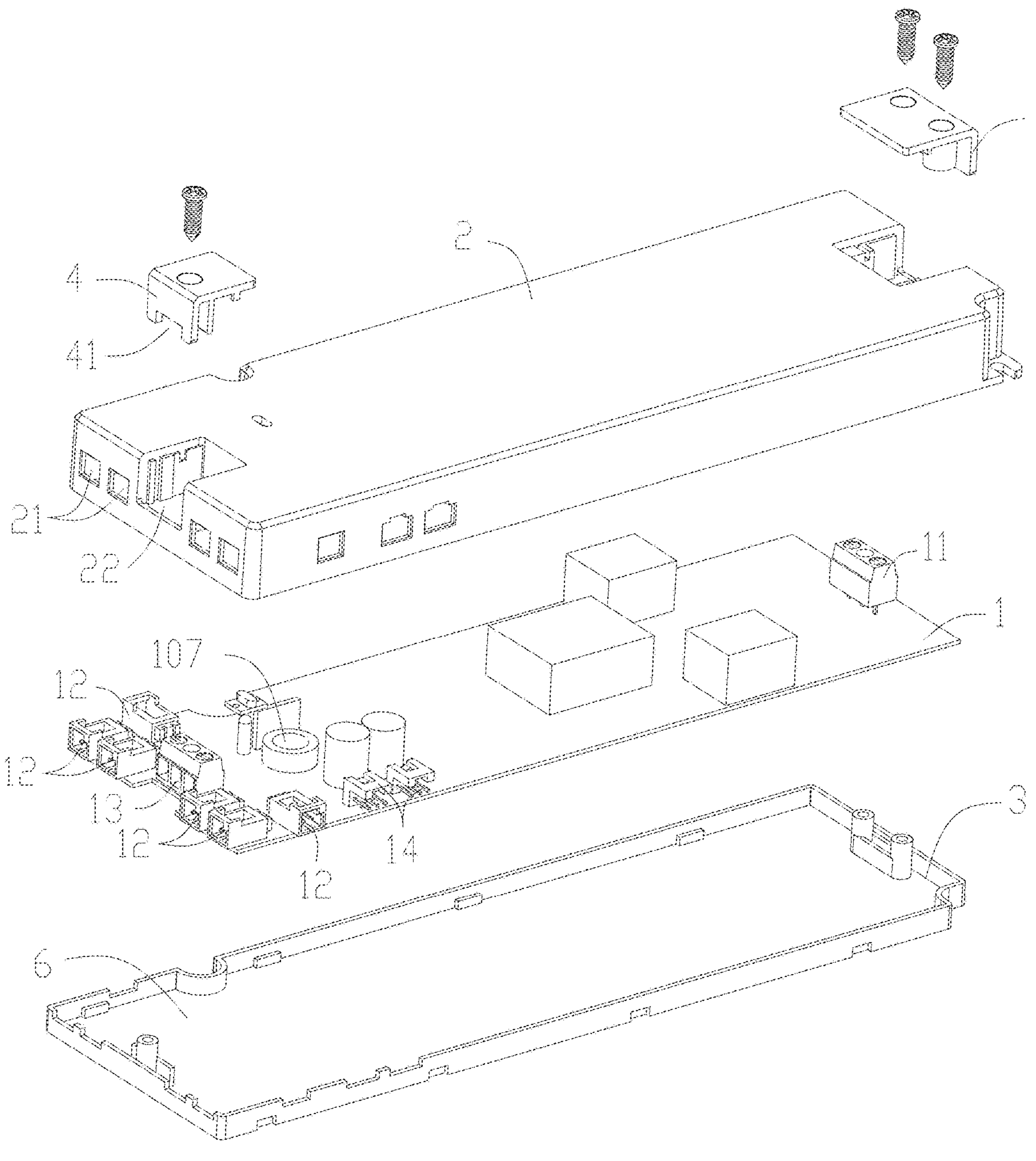
FIG. 3 is an explosive view of a centralized control power supply in the present disclosure.
Figure 4:
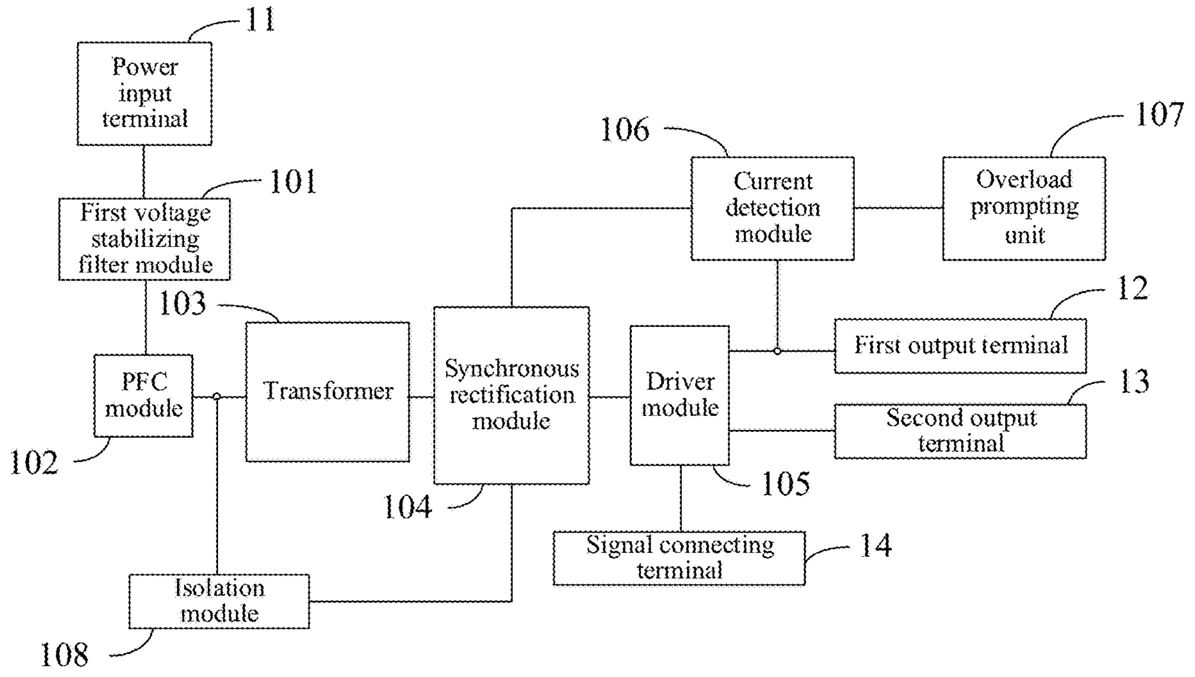
FIG. 4 is a schematic circuit diagram of a centralized control power supply in the present disclosure.
Figure 5:
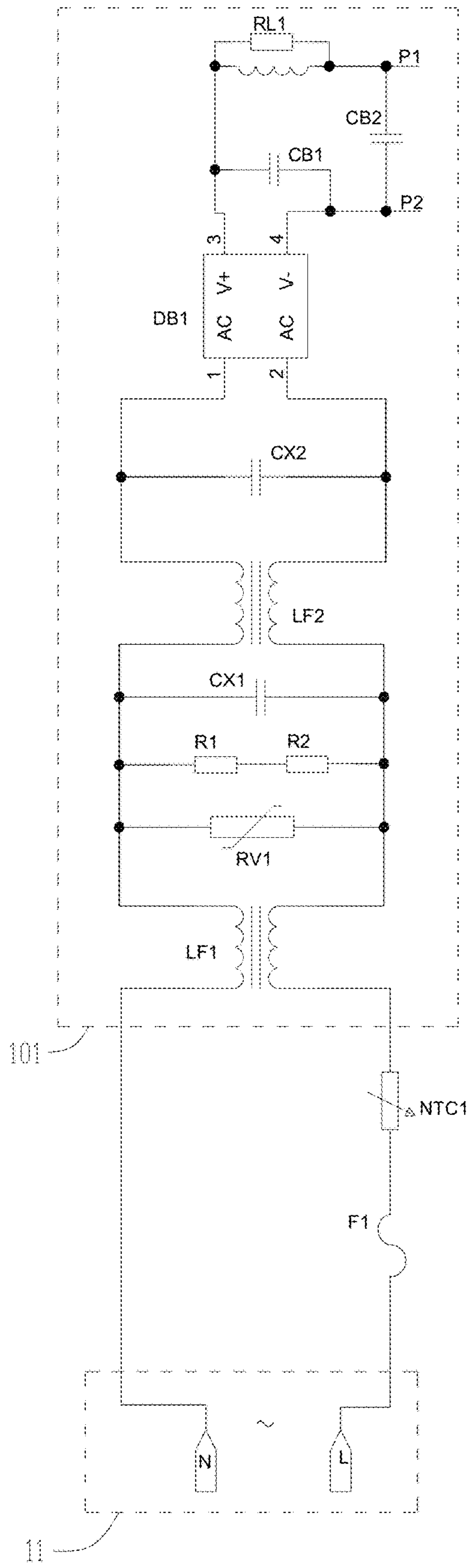
FIG. 5 is a circuit diagram of electric connection between a power input terminal and a first voltage stabilizing filter module in the present disclosure.
Figure 6:
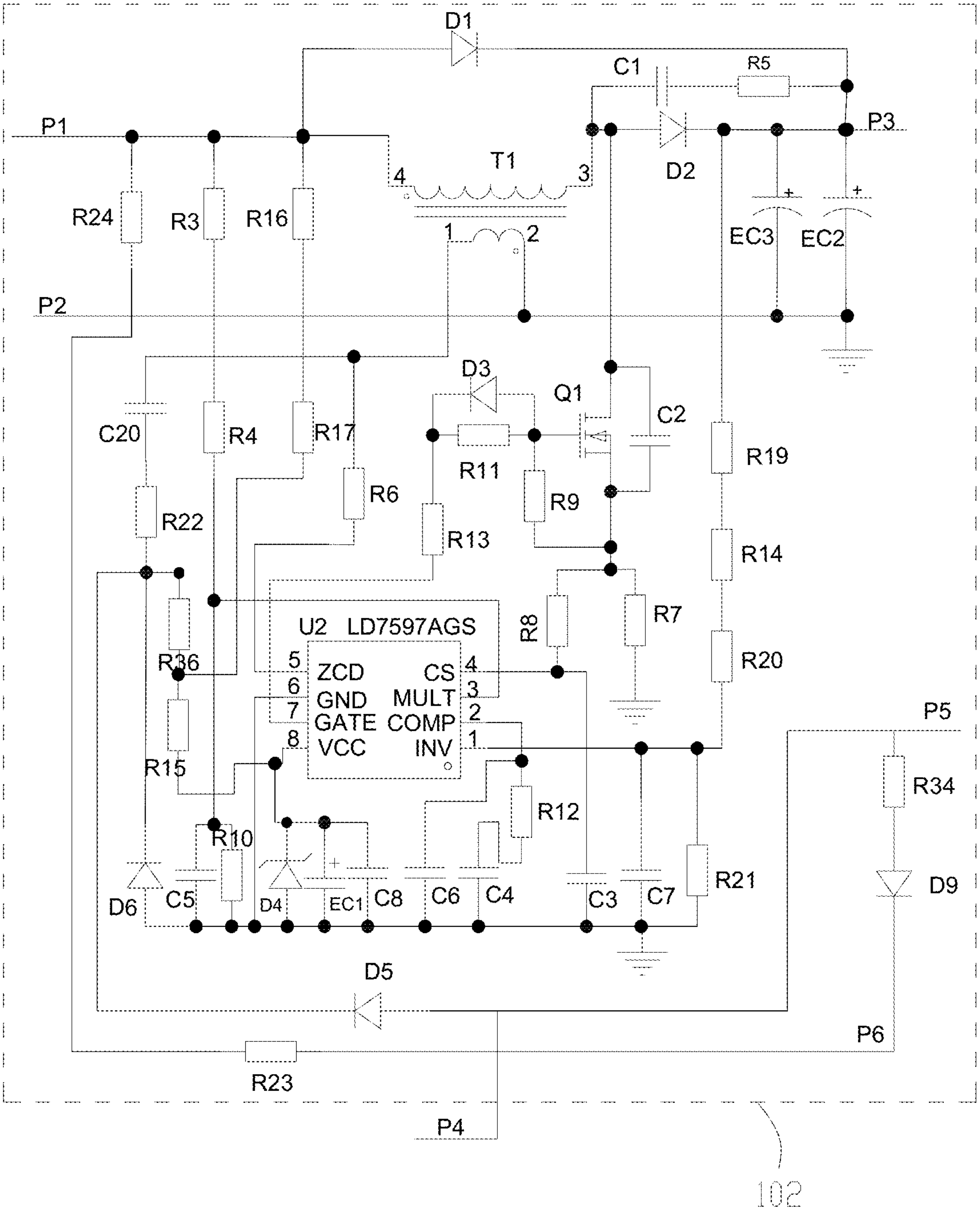
FIG. 6 is a circuit diagram of a PFC (Power Factor Correction) module in the present disclosure.
Figure 7:
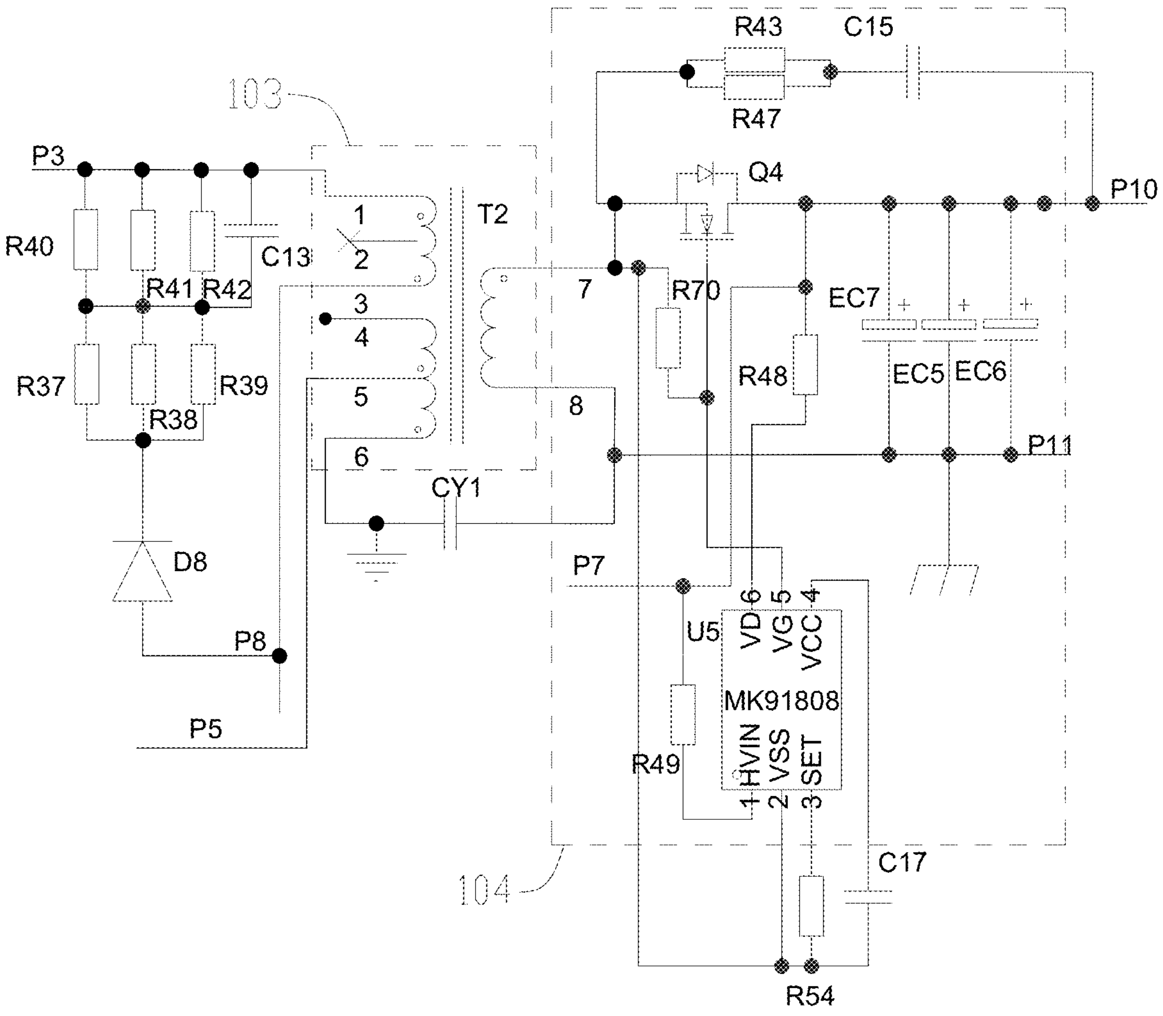
FIG. 7 is a circuit diagram of electric connection between a transformer and a synchronous rectification module in the present disclosure.
Figure 8:
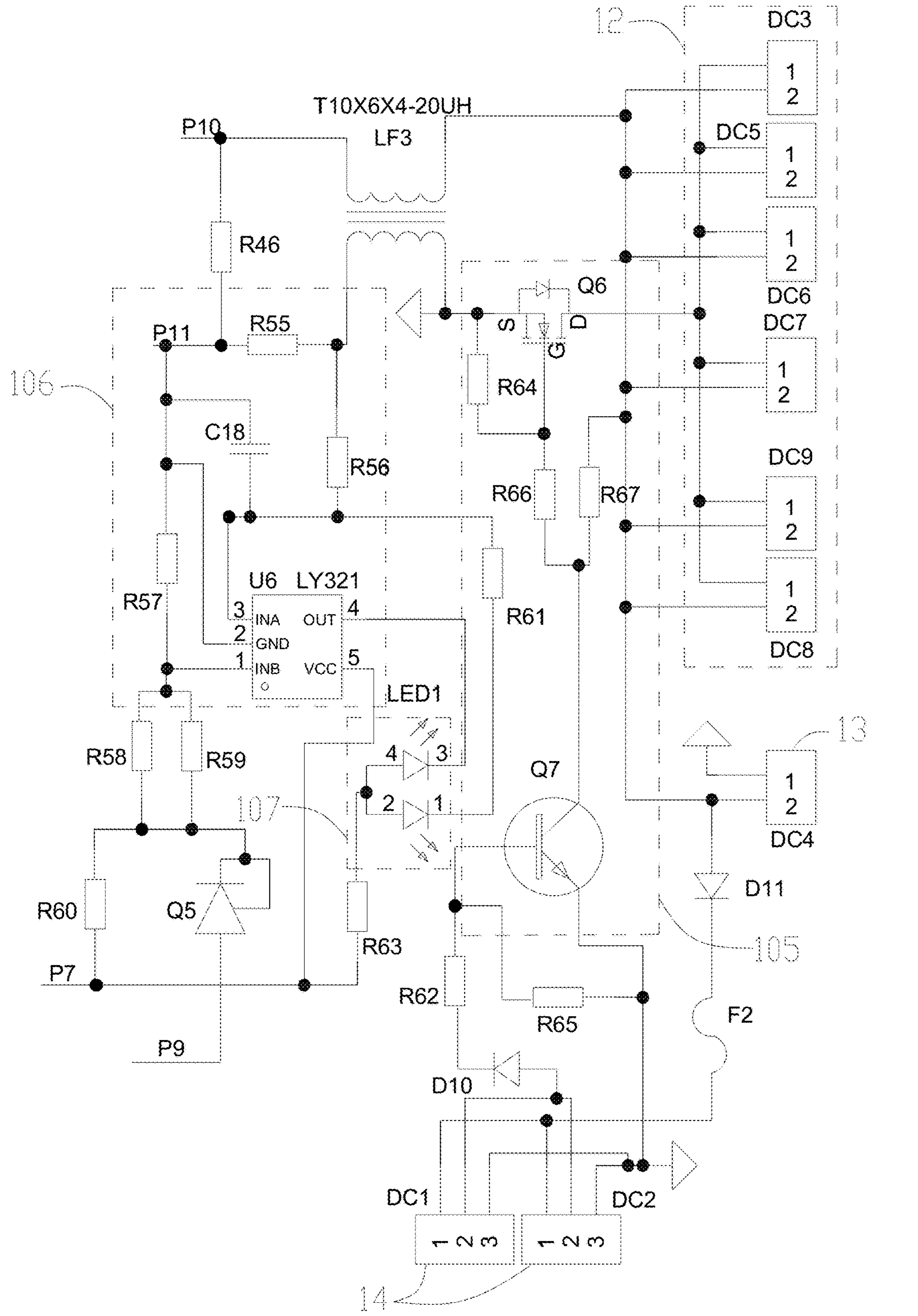
FIG. 8 is a circuit diagram of a current detection module, a driver module, a first output terminal and a second output terminal in the present disclosure.
Figure 9:
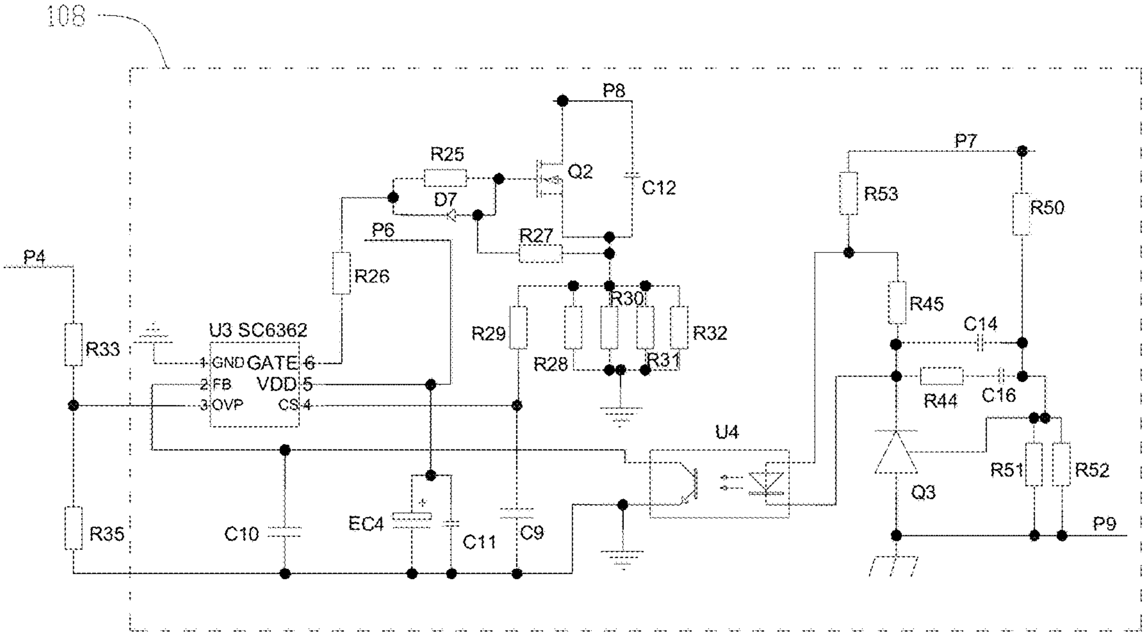
FIG. 9 is a circuit diagram of an isolation module in the present disclosure.

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIG. 1 to FIG. 9, the embodiment of the present disclosure provides a centralized control power supply 10 and a centralized control power supply system.

The centralized control power supply 10 includes a control circuit board 1, and a signal connecting terminal 14, a power input terminal 11 and a first output terminal 12 which are electrically connected with the control circuit board 1. The numbers of the signal connecting terminals 14 and the first output terminals 12 are at least one. The first output terminal 12 is used for connecting a lamp 40. The power input terminal 11 is used for connecting a power supply. That is, a power supply terminal is used for switching on electric supply. The signal connecting terminal 14 is used for externally connecting a controller 30. The signal connecting terminal 14 is used for transmitting a control signal output by the controller 30 to the control circuit board 1. The control circuit board 1 controls one of the on, off and brightness adjustment of the lamp 40 through the first output terminal 12 according to the control signal.

In the embodiment, the signal connecting terminal 14 for connecting the controller 30 is directly arranged on the control circuit board 1, so that the controller 30 can be switched on through a connecting wire directly by a user conveniently. The on, off and brightness adjustment of the lamp 40 can be controlled directly through the control circuit board 1, so that the operation of complex wiring when the lamp 40 is arranged by the user is saved, the lamp 40 is convenient to use, and the user experience is improved.

The controller 30 can be a control switch or a rotary switch. That is, in the embodiment, the control switch or the rotary switch is switched on through the signal connecting terminal 14 by the centralized control power supply 10. When the control switch or the rotary switch is operated by the user, the controller 30 such as the control switch or the rotary switch can output one control signal for the control circuit board 1. The control circuit board 1 can directly drive the lamp 40 or turn off the lamp 40, or adjust the brightness of the lamp 40 according to the control signal. Certainly, the control 30 also can be a wireless receiver. That is, the wireless receiver can be used for receiving wireless signals output by equipment such as cell phones, remote controllers, tablet computers and computers. That is, wireless control for the lamp 40 can be realized by the user through the equipment such as remote controllers, cell phones and tablet computers. Or, the controller 30 also can be a human body sensor, a hand wave sensor, a touch sensor, a gate-control sensor or a magnetic control sensor.

The centralized control power supply 10 also includes a second output terminal 13. The second output terminal 13 is electrically connected with the control circuit board 1. The second output terminal 13 is used for connecting external equipment. The control circuit board 1 is used for processing first alternating current input by the power input terminal 11 to form preset direct current and outputting the preset direct current through the second output terminal 13. That is, it is understood that the centralized control power supply 10 can supply power for the external equipment through the second output terminal 13 independently without the influence of the controller 30, and the centralized control power supply 10 is applicable for products needing to work all the time, so that the product practicality is improved.

The number of the signal connecting terminals 14 is two. The two signal connecting terminals 14 are connected in parallel. The signal connecting terminals 14 also can be used for connecting a signal connecting terminal 14 on another centralized control power supply 10. It is understood that, in one centralized control power supply 10, one signal connecting terminal 14 is used for switching on the controller 30, and the other signal connecting terminal 14 can be connected to a signal connecting terminal 14 on the other centralized control power supply 10 with a connecting wire, so that when the controller 30 outputs the control signal to one centralized control power supply 10, the control signal can be transmitted to the control circuit board 1 of the other centralized control power supply 10 through the signal connecting terminal 14 on the centralized control power supply 10, the connecting wire and the signal connecting terminal 14 on the other centralized control power supply 10 in sequence, and then the control circuit board 1 of the other centralized control power supply 10 can control the on and off of the connected lamp 40 or brightness adjustment according to the control signal, so that one controller 30 simultaneously controls the lamp 40 connected by a plurality of centralized control power supplys 10.

The centralized control power supply 10 also includes an overload prompting unit 107, and the overload prompting unit 107 is electrically connected with the control circuit board 1. The control circuit board 1 drives the overload prompting unit 107 to work when the rated power of the lamp 40 connected to the first output terminal 12 and/or the second output terminal 13 is exceeded, so that the user understands whether the rated power of the centralized control power supply 10 is exceeded during working, and the number of the connected lamps 40 can be reduced or the power of the connected lamp 40 can be adjusted when the rated power of the centralized control power supply 10 is exceeded during working so as to prevent the problem that the centralized control power supply 10 is damaged because of working at excess rated power and improve the service time of the centralized control power supply 10.

The power of the first output terminal 12 is smaller than power output by the second output terminal 13, so that the second output terminal 13 can be externally connected to a lamp 40 with higher power.

Specifically, the second output terminal 13 is a stud wiring terminal, and the first output terminal 12 is a plugging wiring terminal. The current of the stud wiring terminal is larger than that of the plugging wiring terminal.

The number of the first output terminals 12 is six. That is, in the embodiment, the centralized control power supply 10 can be connected to six lamps 40 for use. Certainly, in other embodiments, the number of the first output terminals 12 also can be two, three, four, or the like. Here, the number of the first output terminals 12 is not restricted.

The centralized control power supply 10 includes an outer shell 2 and a bottom shell 3 connected with the outer shell 2 to form a mounting cavity 6. The control circuit board 1 is arranged inside the mounting cavity 6. The signal connecting terminal 14, the power input terminal 11, the first output terminal 12, the second output terminal 13 and the overload prompting unit 107 are all arranged on the control circuit board 1. The outer shell 2 or the bottom shell 3 is detachably provided with a first cover plate 4 at the position corresponding to the second output terminal 13, and a first wire outlet hole 41 is formed in one of the first cover plate 4, the outer shell 2 and the bottom shell 3. The outer shell 2 or the bottom shell 3 is detachably provided with a second cover plate 5 at the position corresponding to the power input terminal 11. A second wire outlet hole 51 is formed in one of the second cover plate 5, the outer shell 2 and the bottom shell 3. Avoidance ports 21 of the second wire outlet hole 51 are formed in the outer shell 2 at the positions corresponding to the signal connecting terminal 14 and the first output terminal 12. The first cover plate 4 is detached so that the power input terminal 11 is wired, and then the first cover plate 4 is mounted to play a role in protecting wiring of the power input terminal 11. The second cover plate 5 is detached so that the second output terminal 13 is wired, and then the second cover plate 5 is mounted to play a role in protecting wiring of the second output terminal 13.

The power input terminal 11 and the second output terminal 13 are respectively arranged at both ends of the control circuit board 1, and the first output terminal 12 is located at the position, close to the second output terminal 13, of the control circuit board 1, so that the connecting wire of the lamp 40 gets away from a voltage wire of the power input terminal 11, the connected wires of the driver in the embodiment can be extended and distributed in order, the crossing of the wires is reduced, and the wire arrangement of the user is facilitated.

The signal connecting terminal 14 is located at the position, close to the second output terminal 13, of the control circuit board 1, so that the connected wire of the signal connecting terminal 14 gets away from the power input terminal 11 to prevent the input control signal from being influenced by a power wire input by the power input terminal 11.

Referring to FIG. 4 to FIG. 9, in the above-described embodiment, the control circuit board 1 is integrated with a voltage stabilizing filter module 101, a PFC module 102, a transformer 103 and a driver module 105. The voltage stabilizing filter module 101 is respectively electrically connected with the power input terminal 11 and the PFC module 102. The transformer 103 is respectively electrically connected with the first output terminal 12, the PFC module 102 and the driver module 105. The driver module 105 is respectively electrically connected with the first output terminal 12 and the signal connecting terminal 14. The voltage stabilizing filter module 101 is used for carrying out voltage stabilizing and filtering processing on first alternating current input by the power input terminal 11 to form second alternating current and transmitting the second alternating current to the PFC module 102. The PFC module 102 is used for adjusting current waveforms in the second alternating current to be the same as voltage waveforms in the second alternating current to form third alternating current and transmitting the third alternating current to the transformer 103. The transformer 103 is used for converting the third alternating current into first direct current and then transmitting the first direct current to the first output terminal 12 and the driver module 105. The driver module 105 is used for controlling one of the on, off and brightness adjustment of the lamp 40 through the first output terminal 12 according to the control signal input by the signal connecting terminal 14. The alternating current input by the power input terminal 11 is processed by the PFC module 102, so that the utilization of the current can be effectively improved, and the waste of energy sources is reduced. The input alternating current can be converted into direct current applicable for the lamp 40 by the transformer 103 so as to drive the connected lamp 40 to work.

The second output terminal 13 of the centralized control power supply 10 with the second output terminal 13 is electrically connected with the output end of the transformer 103, so that the second output terminal 13 has a voltage output, and the second output terminal 13 can be used by an external device.

In the embodiment that the number of the signal connecting terminals 14 is two, one pin of each signal connecting terminal 14 is electrically connected with the output end of the transformer 103, one pin of the signal connecting terminal 14 is grounded, and one pin of the signal connecting terminal 14 is used for transmitting the control signal, so that the two signal connecting terminals 14 are connected in parallel. Since one pin of the signal connecting terminal 14 is electrically connected with the output end of the transformer 103, power can be supplied for the controller 30 when the signal connecting terminal 14 is externally connected to the controller 30, the controller 30 does not need to be externally connected to a power supply, and the wiring of the controller 30 is facilitated.

The control circuit board 1 is integrated with a synchronous rectification module 104. An input end of the synchronous rectification module 104 is connected with the transformer 103. An output end of the synchronous rectification module 104 is respectively electrically connected with the first output terminal 12, the second output terminal 13 and a signal output terminal 14. Harmonic wave removal can be carried out on the direct current output by the transformer 103 by the synchronous rectification module 104, so that the conversion rate of the transformer 103 is improved, and the loss of power is reduced.

The driver module 105 includes a first triode Q7 and a first switch tube Q6. A base electrode of the first triode Q7 is electrically connected with the signal connecting terminal 14. An emitting electrode of the first triode Q7 is grounded. A collector electrode of the first triode Q7 is electrically connected with a control end of the first switch tube Q6 through a first resistor R66. The collector electrode of the first triode Q7 is also electrically connected with the output end of the synchronous rectification module 104 through a second resistor R67. A drain electrode of the first switch tube Q6 is electrically connected with the first output terminal 12. A source electrode of the first switch tube Q6 is grounded.

In this way, when the controller 30 outputs a control signal to the control circuit board 1 through the signal connecting terminal 14, the first triode Q7 is turned on, and the voltage of the control end of the first switch tube Q6 is reduced through the first resistor R66, so that the first triode Q6 is turned on. Therefore, an on loop is formed by the lamp 40 connected to the first output terminal 12, and the output end of the synchronous rectification module 104 drives the lamp 40 to work through the first output terminal 12. On the contrary, when the controller 30 does not input a control signal to the control circuit board 1 through the signal connecting terminal 14, the first triode Q7 is not turned on, that is, the first switch tube Q6 is not turned on either. The output end of the synchronous rectification module 104 and the circuit of the lamp 40 connected to the first output terminal 12 cannot form a loop, that is, the lamp 40 is turned off. When the controller 30 adjusts the size of the control signal output to the control circuit board 1, the on duty ratio of the first switch tube Q6 can be adjusted by the first triode Q7, so that the size of the power output to the first output terminal 12 can be adjusted to realize the brightness adjustment of the lamp 40.

In the embodiment that the centralized control power supply 10 also includes an overload prompting unit 107, the control circuit board 1 is also integrated with a current detection module 106. The current detection module 106 is respectively electrically connected with the overload prompting unit 107, the synchronous rectification module 104 and the source electrode of the first switch tube Q6. The synchronous rectification module 104 is used for supplying power for the current detection module 106 after the voltage output by the transformer 103 is processed. The current detection module 106 is used for detecting current output by the source electrode of the first switch tube Q6 and driving the overload prompting unit 107 to work when the current is larger than preset current so as to realize a reminding effect when the power of the external equipment connected to the centralized control power supply 10 is exceeded.

The overload prompting unit 107 can be a bi-color light. A common pin of the bi-color light is electrically connected with the output end of the synchronous rectification module 104. That is, when the synchronous rectification module 104 has a voltage output, power is supplied for the bi-color light. A negative electrode of a red diode in the bi-color light is electrically connected with the current detection module 106, and a negative electrode of a green diode in the bi-color light is electrically connected with the source electrode of the first switch tube Q6, so that when the first switch tube Q6 is turned on, a green light is on all the time. When the current detection module 106 detects that the power of the external equipment connected to the centralized control power supply 10 is exceeded, a red light is driven to be on, so that the user judges whether the power of the external equipment connected to the centralized control power supply 10 is exceeded or not.

In the above-described embodiment, the current detection module 106 includes an operational amplifier U6 and a current detection resistor R55. One end of the current detection resistor R55 is grounded, and the other end of the current detection resistor R55 is connected to the source electrode of the first switch tube Q6. The output end of the synchronous rectification module 104 is electrically connected with the operational amplifier U6 for supplying power for the operational amplifier U6. A negative electrode of the green diode of the bi-color light is electrically connected to the source electrode of the first switch tube Q6 through a third resistor R61 and a fourth resistor R56 in sequence. A noninverting input end of the operational amplifier U6 is grounded through a capacitor C18. One end, away from the ground, of the capacitor C18 is electrically connected with an output end of the third resistor R61. A reverse input end of the operational amplifier U6 is grounded through a fifth resistor R57. The reverse input end of the operational amplifier U6 is also electrically connected with the output end of the synchronous rectification module 104 through a sixth resistor R58 and a seventh resistor R60. An output end of the operational amplifier U6 is connected to the negative electrode of the red diode in the bi-color light. The current fed back by the current detection resistor R55 is matched with an internal preset value. When the preset value is exceeded, the operational amplifier U6 cooperates with the reverse input end to drive the red light to be on so as to remind the user.

In other embodiments, the overload prompting unit 107 also can be a buzzer, a lamp bead with only one color, or the like.

In the above-mentioned embodiment, the control circuit board 1 is also integrated with an isolation module 108, wherein the isolation module 108 is respectively electrically connected with the input end of the transformer 103 and the output end of the transformer 103 so as to realize the isolation of high voltage and low voltage of the control circuit board 1 and improve the efficiency and stability of the whole circuit of the control circuit board 1.

Based on the above-mentioned centralized control power supply 10, the embodiment also provides a centralized control power supply system.

Figure 10:
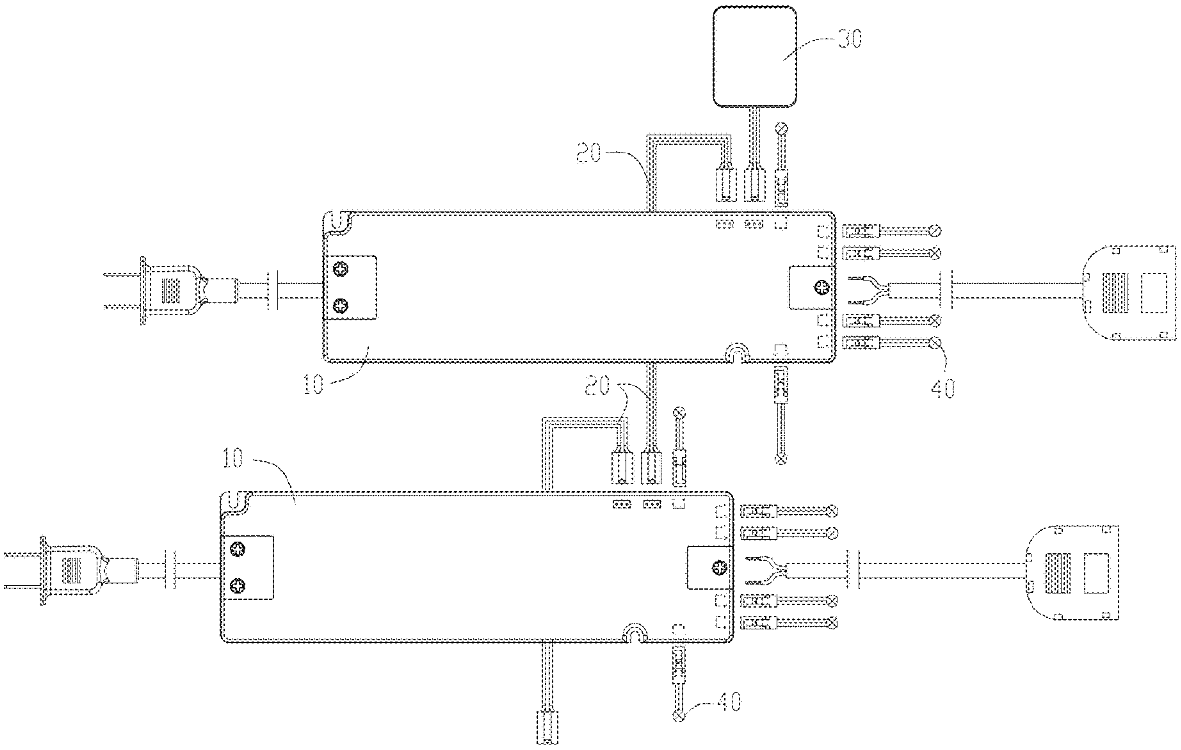
FIG. 10 is a schematic diagram of a centralized control power supply system in the present disclosure.

Referring to FIG. 10, the system includes a signal connecting wire 20, at least one controller 30, and a plurality of centralized control power supplys 10 described as mentioned above.

A signal connecting terminal 14 on at least one centralized control power supply 10 is connected to one controller 30. Both ends of the signal connecting wire 20 are respectively connected to signal connecting terminals 14 on two centralized control power supplys 10. The controller 30 is used for outputting the control signal to the control circuit board 1 in the centralized control power supply 10. The control signal is transmitted to the other centralized control power supply 10 through the signal connecting terminal 14 of the centralized control power supply when one centralized control power supply 10 receives the control signal. Thus, one controller 30 can simultaneously control a plurality of centralized control power supplys 10 to be applicable for scenarios with a large number of lamps 40 through the effects, such as the on, off and lamplight adjustment, of the lamp 40 connected to the first output terminal 12, so that the practicability of the centralized control power supply 10 is improved.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of “first”, “second”, etc. in the present disclosure are only used for descriptive purposes, and cannot be understood as indicating or implying its relative importance or implicitly indicating the number of technical features indicated. Therefore, features defined by “first” and “second” can explicitly instruct or impliedly include at least one feature. In addition, “and/or” in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A centralized control power supply, comprising a control circuit board, and a signal connecting terminal, a power input terminal and a first output terminal which are electrically connected with the control circuit board, wherein the numbers of the signal connecting terminals and the first output terminals are at least one;

the first output terminal is used for connecting a lamp, the power input terminal is used for connecting a power supply, the signal connecting terminal is used for externally connecting a controller, and the signal connecting terminal is used for transmitting a control signal output by the controller to the control circuit board; and the control circuit board controls one of the on, off and brightness adjustment of the lamp through the first output terminal according to the control signal, wherein the number of the signal connecting terminals is two, the two signal connecting terminals are connected in parallel, and the signal connecting terminals also can be used for connecting a signal connecting terminal on another centralized control power supply.

2. The centralized control power supply according to claim 1, also comprising a second output terminal, wherein the second output terminal is electrically connected with the control circuit board, and the second output terminal is used for connecting external equipment; and the control circuit board is used for processing first alternating current input by the power input terminal to form preset direct current and outputting the preset direct current through the second output terminal.

3. The centralized control power supply according to claim 1, wherein the number of the first output terminals is six.

4. A centralized control power supply system, comprising a signal connecting wire, at least one controller and a plurality of centralized control power supplys according to claim 1, wherein a signal connecting terminal on at least one centralized control power supply is connected to one controller, both ends of the signal connecting wire are respectively connected to signal connecting terminals on two centralized control power supplys, the controller is used for outputting the control signal to the control circuit board in the centralized control power supply, and the control signal is transmitted to the other centralized control power supply through the signal connecting terminal of the centralized control power supply when one centralized control power supply receives the control signal.

5. The centralized control power supply system according to claim 4, wherein the controller is a wireless receiver, and the wireless receiver is used for receiving a wireless signal transmitted by external equipment; and electricity is obtained from the control circuit board through the signal connecting terminal when the controller is electrically connected with the signal connecting terminal.

6. The centralized control power supply according to claim 2, wherein the power of the first output terminal is smaller than power output by the second output terminal.

7. The centralized control power supply according to claim 6, wherein the second output terminal is a stud wiring terminal, and the first output terminal is a plugging wiring terminal.

8. A centralized control power supply, comprising a control circuit board, and a signal connecting terminal, a power input terminal and a first output terminal which are electrically connected with the control circuit board, wherein the numbers of the signal connecting terminals and the first output terminals are at least one;

the first output terminal is used for connecting a lamp, the power input terminal is used for connecting a power supply, the signal connecting terminal is used for externally connecting a controller, and the signal connecting terminal is used for transmitting a control signal output by the controller to the control circuit board; and the control circuit board controls one of the on, off and brightness adjustment of the lamp through the first output terminal according to the control signal, wherein the centralized control power supply further comprises a second output terminal, the second output terminal is electrically connected with the control circuit board, and the second output terminal is used for connecting external equipment; and the control circuit board is used for processing first alternating current input by the power input terminal to form preset direct current and outputting the preset direct current through the second output terminal, wherein the centralized control power supply also comprises an overload prompting unit, and the overload prompting unit is electrically connected with the control circuit board; and the control circuit board drives the overload prompting unit to work when the rated power of the lamp connected to the first output terminal and/or the second output terminal is detected to be exceeded.

9. The centralized control power supply according to claim 8, wherein the centralized control power supply comprises an outer shell and a bottom shell connected with the outer shell to form a mounting cavity, the control circuit board is arranged inside the mounting cavity, and the signal connecting terminal, the power input terminal, the first output terminal, the second output terminal and the overload prompting unit are all arranged on the control circuit board;

the outer shell or the bottom shell is detachably provided with a first cover plate at the position corresponding to the second output terminal, and a first wire outlet hole is formed in one of the first cover plate, the outer shell and the bottom shell;

the outer shell or the bottom shell is detachably provided with a second cover plate at the position corresponding to the power input terminal, a second wire outlet hole is formed in one of the second cover plate, the outer shell and the bottom shell, and avoidance ports are formed in the outer shell at the positions corresponding to the signal connecting terminal and the first output terminal.

10. The centralized control power supply according to claim 9, wherein the power input terminal and the second output terminal are respectively arranged at both ends of the control circuit board, and the first output terminal is located at the position, close to the second output terminal, of the control circuit board.

11. The centralized control power supply according to claim 10, wherein the signal connecting terminal is located at the position, close to the second output terminal, of the control circuit board.

12. A centralized control power supply, comprising a control circuit board, and a signal connecting terminal, a power input terminal and a first output terminal which are electrically connected with the control circuit board, wherein the numbers of the signal connecting terminals and the first output terminals are at least one;

the first output terminal is used for connecting a lamp, the power input terminal is used for connecting a power supply, the signal connecting terminal is used for externally connecting a controller, and the signal connecting terminal is used for transmitting a control signal output by the controller to the control circuit board; and the control circuit board controls one of the on, off and brightness adjustment of the lamp through the first output terminal according to the control signal, wherein the control circuit board is integrated with a voltage stabilizing filter module, a PFC (Power Factor Correction) module, a transformer and a driver module, the voltage stabilizing filter module is respectively electrically connected with the power input terminal and the PFC module, the transformer is respectively electrically connected with the first output terminal, the PFC module and the driver module, and the driver module is respectively electrically connected with the first output terminal and the signal connecting terminal;

the voltage stabilizing filter module is used for carrying out voltage stabilizing and filtering processing on first alternating current input by the power input terminal to form second alternating current and transmitting the second alternating current to the PFC module; the PFC module is used for adjusting current waveforms in the second alternating current to be the same as voltage waveforms in the second alternating current to form third alternating current and transmitting the third alternating current to the transformer; the transformer is used for converting the third alternating current into first direct current and then transmitting the first direct current to the first output terminal and the driver module; and the driver module is used for controlling one of the on, off and brightness adjustment of the lamp through the first output terminal according to the control signal input by the signal connecting terminal.

13. The centralized control power supply according to claim 12, also comprising a second output terminal, wherein the second output terminal is electrically connected with an output end of the transformer.

14. The centralized control power supply according to claim 12, wherein the number of the signal connecting terminals is two, one pin of each signal connecting terminal is electrically connected with the output end of the transformer, one pin of the signal connecting terminal is grounded, and one pin of the signal connecting terminal is used for transmitting the control signal.

15. The centralized control power supply according to claim 13, wherein the control circuit board is integrated with a synchronous rectification module, an input end of the synchronous rectification module is connected with the transformer, and an output end of the synchronous rectification module is respectively electrically connected with the first output terminal, the second output terminal and a signal output terminal.

16. The centralized control power supply according to claim 13, wherein the driver module comprises a first triode and a first switch tube, a base electrode of the first triode is electrically connected with the signal connecting terminal, an emitting electrode of the first triode is grounded, a collector electrode of the first triode is electrically connected with a control end of the first switch tube through a first resistor, and the collector electrode of the first triode is also electrically connected with the output end of the synchronous rectification module through a second resistor; and a drain electrode of the first switch tube is electrically connected with the first output terminal, and a source electrode of the first switch tube is grounded.

17. The centralized control power supply according to claim 16, wherein the control circuit board is also integrated with a current detection module, the centralized control power supply also comprises an overload prompting unit, and the current detection module is respectively electrically connected with the overload prompting unit, the synchronous rectification module and the source electrode of the first switch tube; and the current detection module is used for detecting current output by the source electrode of the first switch tube and driving the overload prompting unit to work when the current is larger than preset current.

18. The centralized control power supply according to claim 17, wherein the overload prompting unit is a bi-color light, a common pin of the bi-color light is electrically connected with the output end of the synchronous rectification module, a negative electrode of a red diode in the bi-color light is electrically connected with the current detection module, and a negative electrode of a green diode in the bi-color light is electrically connected with the source electrode of the first switch tube.

19. The centralized control power supply according to claim 18, wherein the current detection module comprises an operational amplifier and a current detection resistor, one end of the current detection resistor is grounded, and the other end of the current detection resistor is connected to a source electrode of the first switch tube;

the output end of the synchronous rectification module is electrically connected with the operational amplifier for supplying power for the operational amplifier, a negative electrode of the green diode of the bi-color light is electrically connected to the source electrode of the first switch tube through a third resistor and a fourth resistor in sequence, a noninverting input end of the operational amplifier is grounded through a capacitor, one end, away from the ground, of the capacitor is electrically connected with an output end of the third resistor, a reverse input end of the operational amplifier is grounded through a fifth resistor, the reverse input end of the operational amplifier is also electrically connected with the output end of the synchronous rectification module through a sixth resistor and a seventh resistor, and an output end of the operational amplifier is connected to the negative electrode of the red diode in the bi-color light.

* * * * *